(12) United States Patent
Venkatachalam et al.

(10) Patent No.: US 11,853,236 B2
(45) Date of Patent: Dec. 26, 2023

(54) ENRICHED AUTO COMMAND FEATURE FOR I3C HOST CONTROLLER

(71) Applicant: Synopsys, Inc., Mountain View, CA (US)

(72) Inventors: Suresh Venkatachalam, Bangalore (IN); Pratap Neelashetty, Bangalore (IN)

(73) Assignee: Synopsys, Inc., Sunnyvale, CA (US)

( * ) Notice: Subject to any disclaimer, the term of this patent is extended or adjusted under 35 U.S.C. 154(b) by 50 days.

(21) Appl. No.: 17/513,379

(22) Filed: Oct. 28, 2021

(65) Prior Publication Data

US 2022/0138126 A1    May 5, 2022

Related U.S. Application Data

(60) Provisional application No. 63/110,264, filed on Nov. 5, 2020.

(51) Int. Cl.
  *G06F 13/16*   (2006.01)
  *G06F 13/42*   (2006.01)
  *G06F 13/24*   (2006.01)

(52) U.S. Cl.
  CPC ...... *G06F 13/1668* (2013.01); *G06F 13/4282* (2013.01)

(58) Field of Classification Search
  None
  See application file for complete search history.

(56) References Cited

U.S. PATENT DOCUMENTS

| | | | | |
|---|---|---|---|---|
| 6,591,325 | B1 * | 7/2003 | Akashi | G06F 13/4204 |
| | | | | 710/305 |
| 9,021,192 | B1 * | 4/2015 | Kang | G06F 12/0253 |
| | | | | 711/100 |
| 10,324,651 | B2 * | 6/2019 | Ngu | G06F 3/0659 |
| 10,860,513 | B1 * | 12/2020 | Cheung | G06F 13/4282 |
| 2017/0308316 | A1 * | 10/2017 | Yamamoto | G06F 3/0604 |

* cited by examiner

*Primary Examiner* — Idriss N Alrobaye
*Assistant Examiner* — Dayton Lewis-Taylor
(74) *Attorney, Agent, or Firm* — Patterson + Sheridan, LLP (57) ABSTRACT

A device includes a memory, a plurality of registers, a multiplexer/demultiplexer circuit, and a controller circuit. The memory stores a plurality of pages of pointers and a table of commands. The plurality of registers store information about a plurality of target devices. The multiplexer/demultiplexer circuit selects (i) information from a register of the plurality of registers based on a request received from a target device of the plurality of target devices, (ii) a page from the plurality of pages based on the selected information, and (iii) a pointer from the selected page based on the selected information. The controller circuit executes a command from the table of commands based on the selected pointer.

18 Claims, 9 Drawing Sheets

| 1 | 1 | 1 | 8 | 8 | 1 | 7 |
|---|---|---|---|---|---|---|
| ACTP_PAGE | AC_EN | IBI_NAK | MDB_MASK | MDB_VALUE | MDB_EN | DEV_ADDR |

ENRICHED AUTO COMMAND FEATURE FOR I3C HOST CONTROLLER

CROSS-REFERENCE TO RELATED APPLICATIONS

This application claims priority to and the benefit of U.S. Provisional Patent Application Ser. No. 63/110,264, entitled "Enriched Auto Command Feature for I3C Master Controller," filed Nov. 5, 2020, which is incorporated herein by reference in its entirety.

TECHNICAL FIELD

The present disclosure relates to serial communication.

BACKGROUND

I2C is a popular, low-cost, 2-wire serial protocol used to communicate between multiple devices sharing only those wires using a client-server model. One wire carries the clock, and another wire carries the serial data between two devices (e.g., a host device and a target device). Most target devices (e.g., sensor devices) use an I2C bus to connect with a host device without using expensive physical layers. Each target device uses a 7-bit static address for identification.

Because the I2C protocol does not allow the target devices to initiate data transfer with the host device, target devices may use an out-of-band (OOB) interrupt signal over an additional wire to indicate the need for the host's attention.

With the introduction of the I3C protocol, the target devices' capability is enhanced to support an in-band interrupt (IBI) feature to the 2-wire protocol in addition to other enhancements like higher data rates and dynamic addressing. The IBI feature allows the target device to initiate an interrupt over the data wire and send its 7-bit unique address followed by an optional interrupt identifier byte called a mandatory data byte (MDB) as payload data to indicate to the host device the interrupt source (from which target device) and an identifier for the interrupt (the event that caused the interrupt), which avoids the need for additional wires.

The I3C v1.1 specification divides the 8-bit MDB value into two identifiers. The most significant bits form the interrupt group identifier (IGI) and the least significant bits form the specific interrupt identifier (SII). The specification describes one such IGI as pending read notification (PRN). On accepting an IBI from a target device with the IGI value as PRN, the host device is expected to subsequently issue a private read to the requesting target, which allows the target to return the data message associated with the IBI.

The existing technology enables an interface peripheral controller of the host device to interrupt the software/firmware on a reception of an IBI, and the interface peripheral controller waits for the software to take necessary actions including the issuance of appropriate read commands. Although this model provides flexibility in deciding what action to take, it lacks the ability to handle time-critical actions, especially when the target device expects the host device to read the target device's transmit buffer quickly. For example, a read command may be queued on top of several pipelined commands, which delays the read command being handled. Stated differently, priority is not given to the read command, which may be time-critical.

SUMMARY

According to an embodiment, a device includes a memory, a plurality of registers, a multiplexer/demultiplexer circuit, and a controller circuit. The memory stores a plurality of pages of pointers and a table of commands. The plurality of registers store information about a plurality of target devices. The multiplexer/demultiplexer circuit selects (i) information from a register of the plurality of registers based on a request received from a target device of the plurality of target devices, (ii) a page from the plurality of pages based on the selected information, and (iii) a pointer from the selected page based on the selected information. The controller circuit executes a first command from the table of commands based on the selected pointer.

The request may include an I3C in-band interrupt.

The controller circuit may further execute a second command from the table of commands after executing the first command. The second command is stored next to the first command in the table of commands. The pointers in the selected page point to commands in the table of commands other than the second command.

The controller circuit may further disregard a second request received from a target device of the plurality of target devices based on information stored in a register of the plurality of registers selected by the multiplexer/demultiplexer circuit based on the second request.

The controller circuit may further execute the first command by reading data from the target device of the plurality of target devices.

At least two pointers from the selected page may point to a same command in the table of commands.

The multiplexer/demultiplexer circuit may include a first multiplexer, a second multiplexer, and a demultiplexer. The first multiplexer selects a data byte from the register of the plurality of registers based on an address of the target device in the request. The second multiplexer selects a page identifier from the register of the plurality of registers based on the address of the target device in the request. The demultiplexer selects the page of the plurality of pages based on the page identifier. The selected data byte may identify the pointer from the selected page.

The controller circuit may communicate information received by executing the first command to a hardware processor.

According to another embodiment, a method includes storing a plurality of pages of pointers and a table of commands and storing, at a plurality of registers, information about a plurality of target devices. The method also includes selecting (i) information from a register of the plurality of registers based on a request received from a target device of the plurality of target devices, (ii) a page from the plurality of pages based on the selected information, and (iii) a pointer from the selected page based on the selected information. The method further includes executing, by a processing device, a command from the table of commands based on the selected pointer.

The request may include an I3C in-band interrupt.

The method may also include executing, by the processing device, a second command from the table of commands after executing the first command. The second command may be stored next to the first command in the table of commands. The pointers in the selected page may point to commands in the table of commands other than the second command.

The method may further include disregarding, by the processing device, a second request received from a target device of the plurality of target devices based on information stored in a register of the plurality of registers selected by the multiplexer/demultiplexer circuit based on the second request.

The method may also include executing, by the processing device, the first command by reading data from the target device of the plurality of target devices.

At least two pointers from the selected page may point to a same command in the table of commands.

A data byte of the target device may be selected based on an address of the target device in the request and a page identifier from the register of the plurality of registers may be selected based on the address of the target device in the request. The page of the plurality of pages may be selected based on the page identifier. The selected data byte may identify the pointer from the selected page.

The method may also include communicating, by the processing device, information received by executing the first command to a hardware processor.

According to another embodiment, a hardware processor and a host controller communicatively coupled to the hardware processor. The host controller includes a memory, a plurality of registers, a multiplexer/demultiplexer circuit, and a controller circuit. The memory stores a plurality of pages of pointers and a table of commands. The plurality of registers stores information about a plurality of target devices. The multiplexer/demultiplexer circuit selects (i) information from a register of the plurality of registers based on a request received from a target device of the plurality of target devices, (ii) a page from the plurality of pages based on the selected information, and (iii) a pointer from the selected page based on the selected information. The controller circuit executes a first command from the table of commands based on the selected pointer and communicates information received by executing the first command to the hardware processor.

The request may include an I3C in-band interrupt.

The controller circuit may also execute a second command from the table of commands after executing the first command. The second command may be stored next to the first command in the table of commands. The pointers in the selected page may point to commands in the table of commands other than the second command.

The multiplexer/demultiplexer circuit may include a first multiplexer that selects a data byte of the target device based on an address of the target device in the request and a second multiplexer that selects a page identifier from the register of the plurality of registers based on the address of the target device in the request. The multiplexer/demultiplexer circuit may also include a demultiplexer that selects the page of the plurality of pages based on the page identifier. The selected data byte may identify the pointer from the selected page.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Aspects of the present disclosure relate to an enriched auto command feature for an I3C host controller. Generally, this disclosure describes a hardware-based implementation for the I3C host controller that provides an autonomous in-band interrupt (MI) response for categories of the mandatory data byte (MDB) values, including the pending read notification (PRN), through an enriched auto command (EAC) architecture. The EAC architecture allows the I3C host controller to handle time-sensitive data reads based on pre-programmed profile information.

The architecture allows the software in the I3C host device to offload the handling of the IBI request from an I3C target device automatically to the underlying host controller hardware. This provide two main benefits:

1. Reduces the latency in responding to an IBI, especially when the target device has already prepared data for an event and expects the I3C host to read that data quickly due to either buffer constraint or the time-sensitive nature of the data. For example, frame image data waiting for a host to process for a lag-free user experience.

2. Reduces the interrupts to the processor of the host device, freeing the processor from getting involved in hardware-centric IBI screening of various target devices.

The architecture also provides a mechanism in the I3C host controller to decide and issue one or more read auto-commands for a single IBI from the preprogrammed set of commands based on the received MDB/PRN. The read command can be either a simple read, a combo-read (write transfer followed by a read transfer), or a common command control read (e.g., device to device read transfer) as defined in the I3C Specification.

A simple read is applicable when the data source is directly from the target device's transmit buffer. There is no need for the controller to set any data source index in the target device before issuing a read command. The preprogrammed read command can specify at what data rate (e.g., any data rate described in the I3C Specification) the data should be read from the target device based on the capability of the target device.

A combo-read is applicable when the data sources are different for different events within the target device. Here the controller sets the data source index in the target device either through a separate short write transfer or as a part of a read transfer as defined by the I3C specification and immediately followed by reading the data.

In certain embodiments, the architecture reduces the latency in responding to IBIs from one or more target devices. In some embodiments, the architecture improves the efficiency of the host software by offloading the IBI screening functionality to the hardware. In an embodiment, the architecture reduces the amount of hardware resources by reusing common resources when supporting IBIs from multiple target devices.

Figure 1:
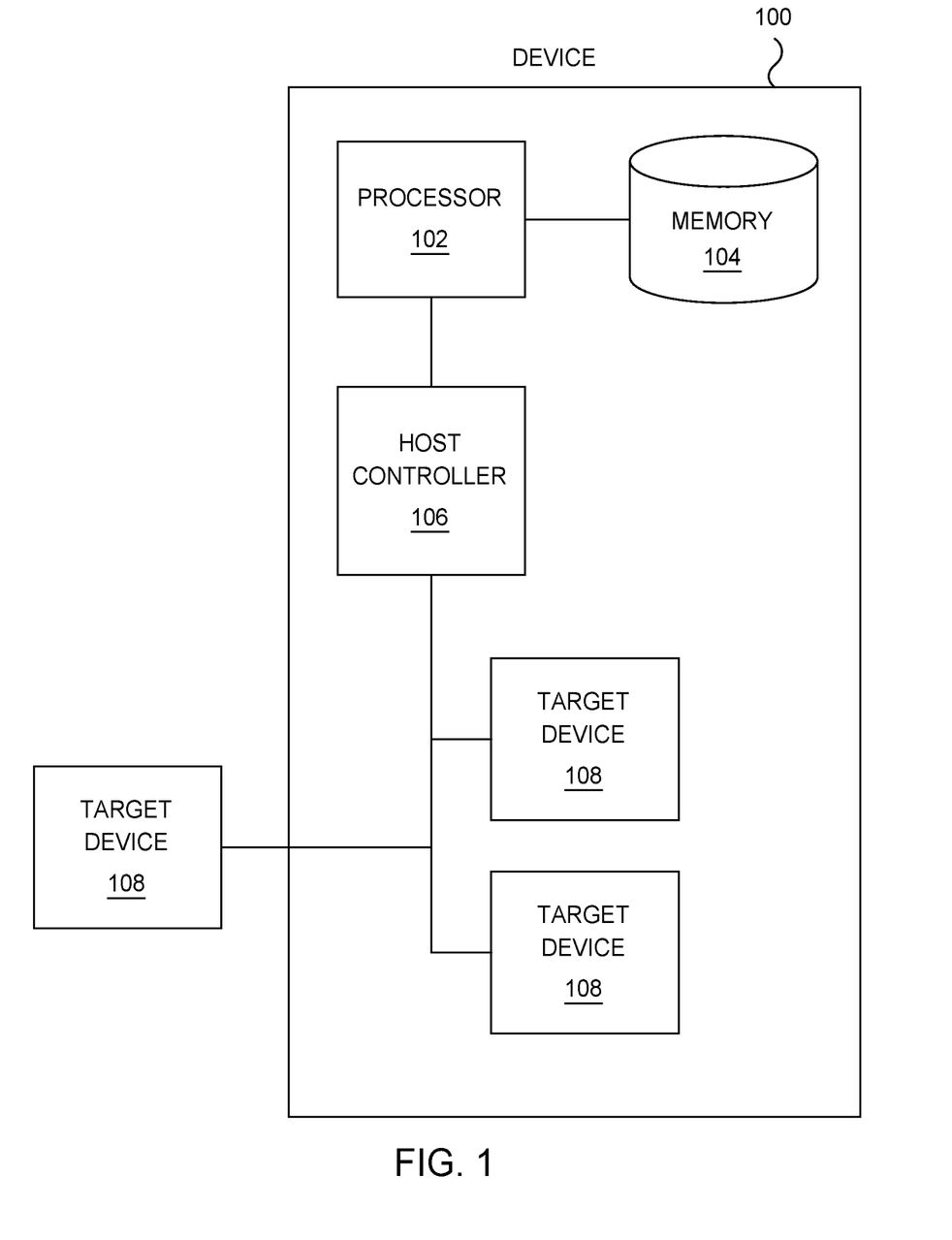
FIG. 1 illustrates an example device.

FIG. 1 illustrates an example device 100. As seen in FIG. 1, the host device 100 includes a processor 102, a memory 104, a host controller 106, and one or more target devices 108. Generally, the host controller 106 handles IBIs from the target device 108 without involving the processor 102 or other software applications in the device 100. The device 100 may be a computer, a laptop, a wireless or cellular telephone, an electronic notebook, a personal digital assistant, a tablet, or any other device capable of receiving, processing, storing, and/or communicating information. The device 100 may also include a user interface, such as a display, a microphone, keypad, a camera, or other appropriate terminal equipment.

The processor 102 is any electronic circuitry, including, but not limited to microprocessors, application specific integrated circuits (ASIC), application specific instruction set processor (ASIP), and/or state machines, that communicatively couples to memory 104 and controls the operation of the device 100. The processor 102 may be 8-bit, 16-bit, 32-bit, 64-bit or of any other suitable architecture. The processor 102 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 102 may include other hardware that operates software to control and process information. The processor 102 executes software stored on memory to perform any of the functions described herein. The processor 102 controls the operation and administration of the device 100 by processing information (e.g., information received from the host controller 106 or memory 104). The processor 102 may be a programmable logic device, a microcontroller, a microprocessor, any suitable processing device, or any suitable combination of the preceding. The processor 102 is not limited to a single processing device and may encompass multiple processing devices.

The memory 104 may store, either permanently or temporarily, data, operational software, or other information for the processor 102. The memory 104 may include any one or a combination of volatile or non-volatile local or remote devices suitable for storing information. For example, the memory 104 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 104, a disk, a CD, or a flash drive. In particular embodiments, the software may include an application executable by the processor 102 to perform one or more of the functions described herein.

The host controller 106 is communicatively coupled to the target devices 108 and includes circuitry that handles IBIs from the target devices 108. Generally, the host controller 106 includes registers, a multiplexer/demultiplexer circuit, a memory, and controller circuitry that receives and translates IBIs from the target devices 108 into commands to be executed. The host controller 106 then executes the commands (e.g., reading data from a target device 108). In some embodiments, the host controller 106 communicates information received when executing the commands to the processor 102. The processor 102 may then use that information to perform other operations.

The target devices 108 may be any suitable devices that collect information and provide that information to the device 100. For example, the target devices 108 may be sensors that measure or detect certain properties and provide the measured or detected information to the host controller 106. One or more target devices 108 may be external to the device 100 and communicatively coupled to the device 100.

In one example implementation, the device 100 is an AR/VR (augmented reality/virtual reality) headset that includes a display and target sensor devices 108 such as a proximity sensor, an accelerometer, a gyrometer, and a touch sensor. The sensors capture the position, movement, and orientation of the headset and send the availability of sensed data in the form of IBI for the host controller 106 to read with the lowest latency. The host controller 106 translates the IBI to determine that a read command should be executed to read the sensed data from the requested target sensor device 108. The host controller 106 executes the read command and receives the sensed data of various target sensor devices 108 when the sampled sensed data is available. The host controller 106 then processes the data from the different sensors in real-time to adjust the image and audio on the display and headphones accordingly for a lag-free user experience.

Figure 2:
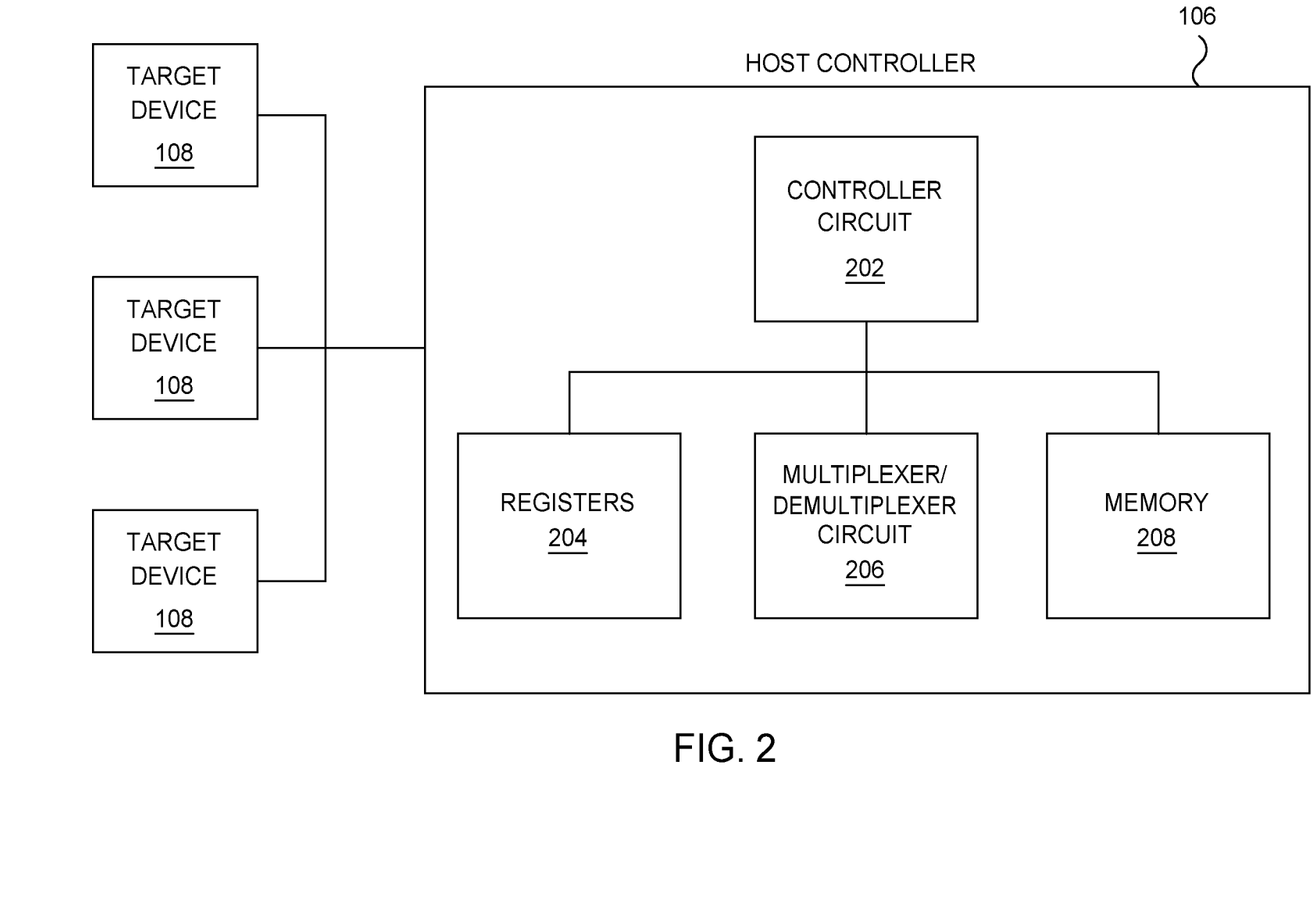
FIG. 2 illustrates an example host controller and example target devices.

FIG. 2 illustrates an example host controller 106 and example target devices 108. As discussed above, the host controller 106 and one or more target devices 108 may be included in the device 100. The host controller 106 includes a controller circuit 202, a register 204, a multiplexer/demultiplexer circuit 206, and a memory 208. Generally, the host controller 106 translates IBIs from the target devices 108 into commands. The host controller 106 then executes these commands.

The controller circuit 202 includes circuitry that performs the processing, translation, and execution functions of the host controller 106. For example, the host controller includes circuitry that receives IBIs from the target devices 108 and interacts with the registers 204, multiplexer/demultiplexer circuit 206, and memory 208 to translate these IBIs into commands to be executed. The circuitry then executes these commands.

The registers 204 include pre-programmed information about the target devices 108. For example, the registers 204 may include the addresses and status information of the target devices 108. The registers 204 may also include information about whether the host controller 106 should handle IBIs from the target devices 108.

The multiplexer/demultiplexer circuit 206 uses information in the IBIs from the target devices 108 and information from the registers 204 to determine location(s) in the memory 208 that store corresponding commands. Stated differently, the multiplexer/demultiplexer circuit 206 translates a received IBI into a corresponding location in the memory 208.

The memory 208 stores a table of commands to be executed by the controller circuit 202. The multiplexer/demultiplexer circuit 206 provides a location in the memory 208 based on a received IBI, and the memory 208 provides a command from the table of commands based on the provided location. The controller circuit 202 then executes the provided command. The memory 208 may be implemented in the memory 104 of the device 100, or the memory 208 may be distinct from the memory 104 of the device 100.

Figure 3:
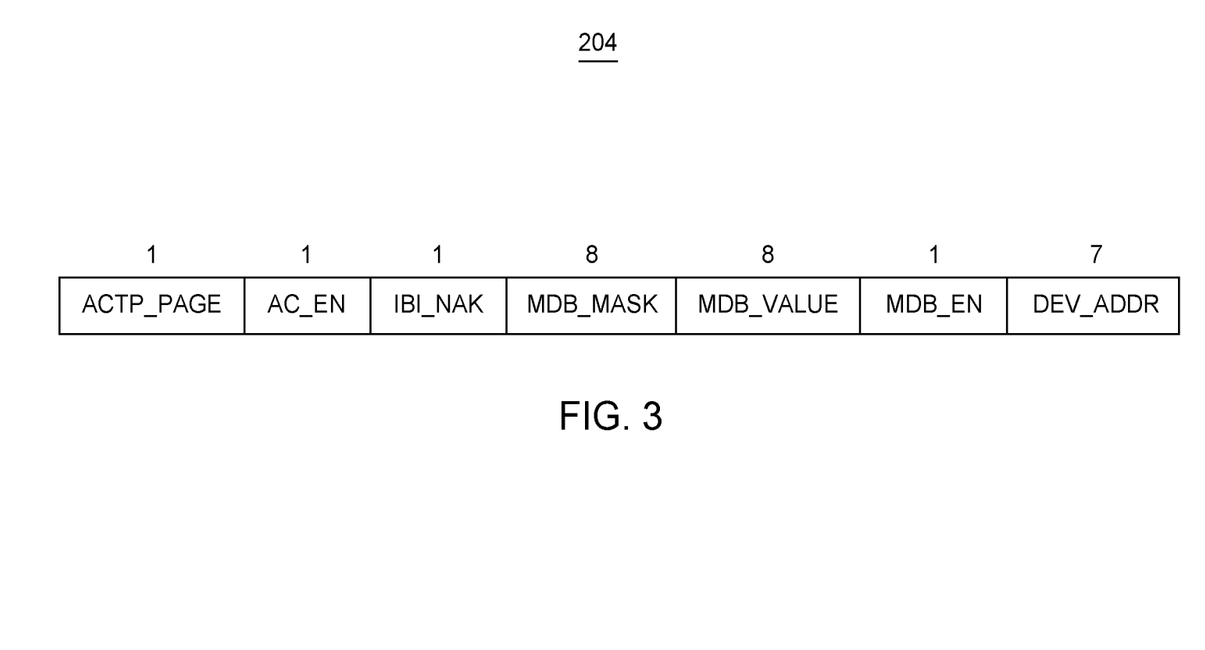
FIG. 3 illustrates example information stored in a register.

FIG. 3 illustrates example information stored in a register 204. Generally, the register 204 (also referred to as the IBI response control (IRC) register) maintains the controls for handling IBIs from a target device 108. The host controller 106 is expected to implement one IRC register for each attached target device 108 in an I3C system that supports IBI with or without MDB. FIG. 3 depicts the fields in the IRC register and the number of bits in each field. The following table describes each of these fields.

| Field Name | Description |
| --- | --- |
| DEV_ADDR | This field holds the 7-bit target device address. If there is more than one IRC register preset in an I3C host controller, each DEV_ADDR register field is expected to hold a unique DEV_ADDR value. The host controller uses this field to compare with the requesting target device address received during IBI reception. If there is an address match with any of the available DEV_ADDR fields, then the host controller uses the remaining fields of the matching IRC register for further screening before responding to the incoming IBI. If there is no match with any of the available DEV_ADDR fields, the host controller does not accept the IBI (NACK) and disables the target device from sending further IBIs through the methods defined by the I3C specification. |
| MDB_EN | When this control bit is set, the I3C host controller issues additional clocks to receive the MDB. If this bit is not set, the controller does not issue any additional clocks to the target device (which also means that the target device does not support MDB). This control bit is not set when the target device with DEV_ADDR does not support MDB. |
| MDB_VALUE | This 8-bit field holds the expected MDB value from the target device. The host controller uses this field along with the MDB_MASK to find a match or no-match before proceeding with the next level of screening. This field is applicable only when AC_EN is set to 1. |
| MDB_MASK | This 8-bit field holds the mask value to be used along with the MDB_VALUE for comparing the received MDB for a match. If any of the bit fields of this register is set to 1, it indicates the corresponding bit field(s) of the MDB_VALUE register should be treated as "Don't Care." If any of the bit fields of this register is set to 0, it indicates that the corresponding bit field(s) of the MDB_VALUE register should be treated as expected value for a match. This register value is applicable only when AC_EN is set to 1. |
| IBI_NAK | When this control bit is set, the host controller does not accept IBI (NACK) from a target device and no further screening is required. When this control bit is not set, the host controller checks for any DEV_ADDR match before accepting the IBI (ACK). |
| AC_EN | When this control bit is set, the host controller proceeds with the MDB match before scheduling an auto-command. When this control bit is not set, the host controller does not schedule an auto-command. |
| ACTP_PAGE | This control bit indicates the auto-command table page ID to be used for scheduling the auto-command if multiple pages of ACTP are available. A value of 0 indicates that page 0 of the auto-command table pointer register should be used. A value of 1 indicates that page 1 of the auto-command table pointer register should be used. This control bit is applicable only when AC_EN bit is set to 1. This field can be optionally expanded to increase the number of auto-command tables. |

Figure 4:
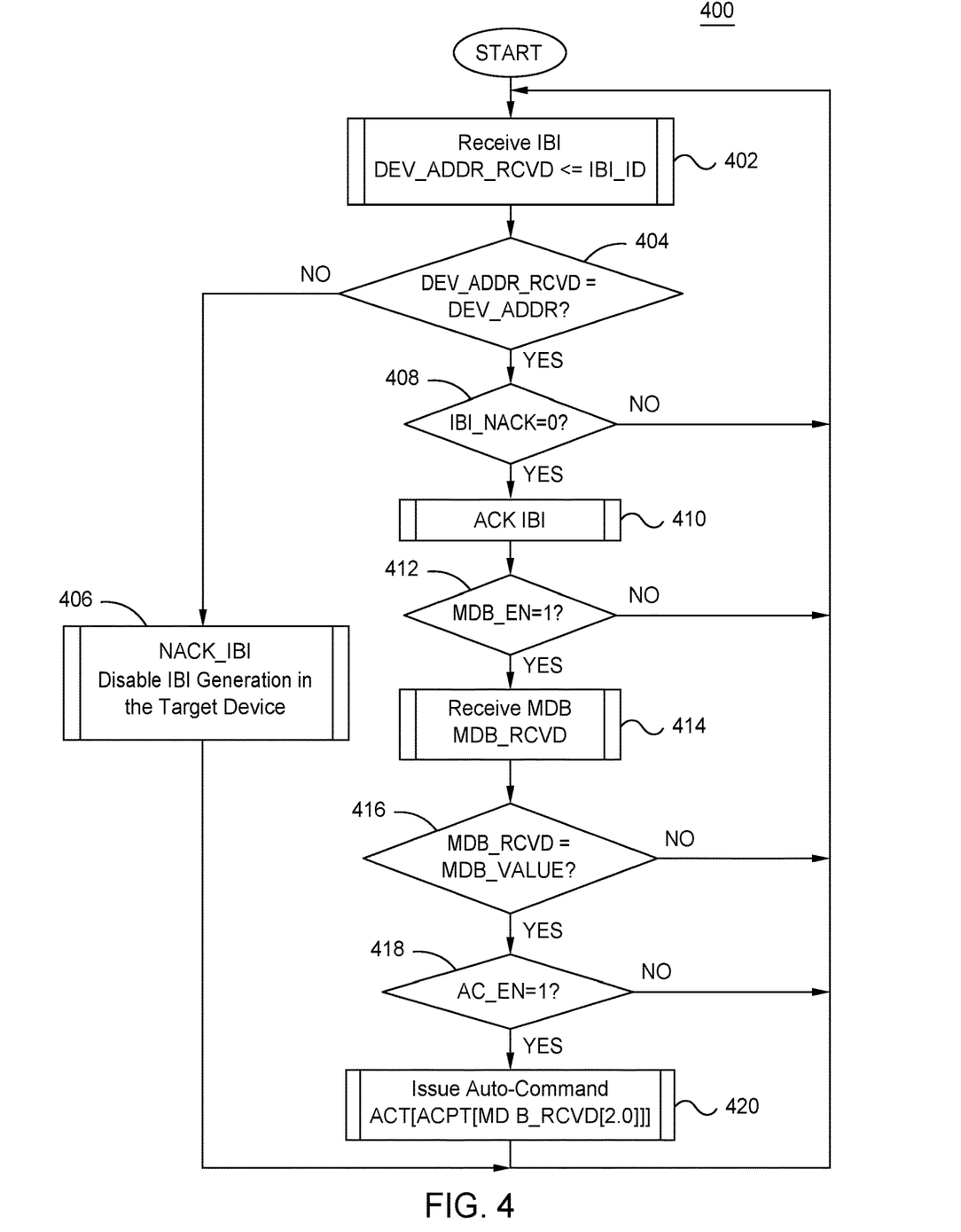
FIG. 4 is a flowchart of an example method for responding to an in-band interrupt.

FIG. 4 is a flowchart of an example method 400 for responding to an in-band interrupt. Generally, the controller circuit 202 performs the steps of the method 400.

In 402, the controller circuit receives an IBI that includes an address of a target device 108 that communicated the IBI (DEV_ADDR_RCVD). In 404, the controller circuit 202 compares the DEV_ADDR_RCVD with the device addresses stored in the registers 204 (DEV_ADDR). If DEV_ADDR_RCVD does not match any of the DEV_ADDR in the registers 204, then the controller circuit 202 disables IBI generation in the target device 108 in 406 and ends the method 400. If DEV_ADDR_RCVD matches a DEV_ADDR in a register 204, then the controller circuit 202 continues processing the IBI using information in that register 204.

In 408, the controller circuit 202 determines whether the IBI_NAK field in the register 204 is set to 0. If not, the controller circuit 202 ends the method 400. If the IBI_NAK field is set to 0, then the controller circuit 202 sends an ACK_IBI in 410. The controller circuit 202 then determines whether the MDB_EN field in the register 204 is set to 1 in 412. If not, the controller circuit 202 ends the method 400. If so, the controller circuit 202 receives an MDB (MDB_RCVD) from the target device 108 in 414. MDB_RCVD may be part of the IBI from the target device 108.

In 416, the controller circuit 202 compares MDB_RCVD to the MDB_VALUE considering the MDB MASK fields of the register 204. If MDB_RCVD does not match MDB_VALUE, then the controller circuit 202 ends the method 400. If MDB_RCVD matches MDB_VALUE, then the controller circuit 202 determines whether the AC_EN field in the register 204 is set to 1 in 418. If the AC_EN field is set to 0, then the controller circuit 202 ends method 400. If the AC_EN field is set to 1, then the controller circuit 202 proceeds to translate the IBI into a command and executes that command in 420. If the controller circuit 202 does not reach 420 in the method 400, then the controller circuit 202 may disregard the IBI from the target device 108.

Figure 5:
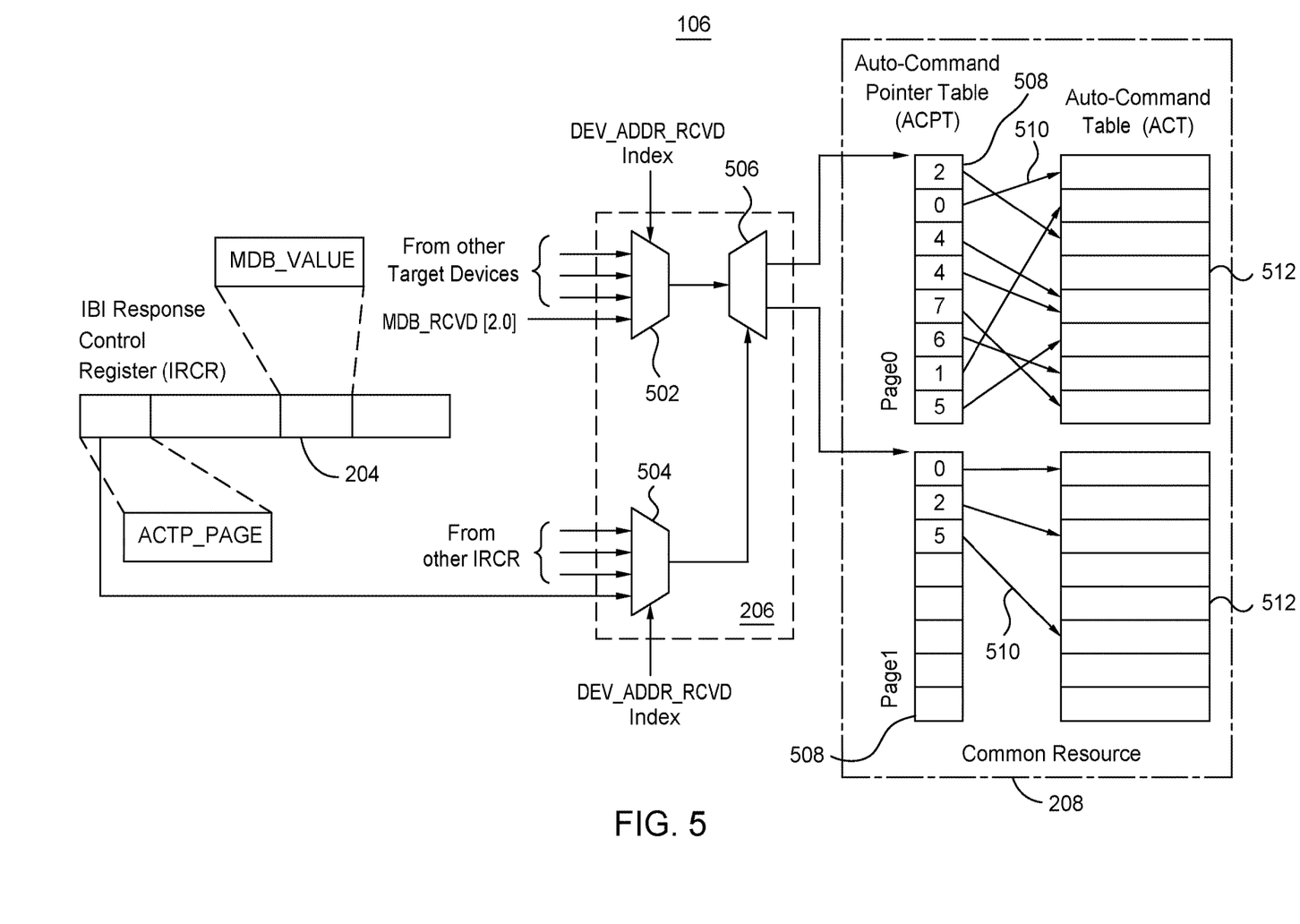
FIG. 5 illustrates an example host controller with an auto command block.

FIG. 5 illustrates an example host controller 106 with an auto command block. As seen in FIG. 5, the host controller 106 includes a register 204, a multiplexer/demultiplexer circuit 206, and a memory 208. The register 204 may have been selected based on DEV_ADDR_RCVD, as discussed with respect to FIG. 4. Generally, if the host controller 106 determines that an IBI should be translated into a command, then the host controller 106 uses information in the register 204, the multiplexer/demultiplexer circuit 206, and the memory 208 to translate the IBI into a command. If the information in the selected register 204 indicates that the IBI should not be translated into a command, then the host controller 106 may disregard the IBI.

The multiplexer/demultiplexer circuit 206 includes a multiplexer 502, a multiplexer 504, and a demultiplexer 506. The multiplexer 502 receives the MDB_RCVD from the target device 108. As discussed with respect to FIG. 4, the MDB_RCVD should match the MDB_VALUE considering the MDB MASK fields of the register 204 if the host controller 106 is to translate the IBI into a command. The multiplexer 502 selects the appropriate MDB_RCVD from the target device 108 based on the DEV_ADDR_RCVD in the IBI.

The multiplexer 504 receives the ACTP_PAGE values from the registers 204. The multiplexer 504 selects the appropriate ACTP_PAGE value from the registers 204 based on the DEV_ADDR_RCVD in the IBI.

The demultiplexer 506 uses the MDB_RCVD received from the multiplexer 502 to index into the appropriate page 508 in memory 208 based on the ACTP_PAGE received from multiplexer 504. In the example of FIG. 5, the demultiplexer 506 may use the MDB_RCVD to index into either Page0 or Page1 in memory 208. Each page 508 includes several pointers 510 into a table 512 of commands (also referred to as an auto-command table). The pointers in each page 508 may point to different tables of 512 commands. The MDB_RCVD indicates which pointer 510 in a page 508 should be selected. The command in the table 512 to which the selected pointer 510 points is then retrieved to be executed by the host controller 106.

For example, if ACTP_PAGE is 0 and the MDB_RCVD is 0, then the demultiplexer 506 would index into the first pointer 510 in page0. This pointer 510 is '2,' which references the third command in the table 512. This command is retrieved for the host controller 106 to execute.

As seen in the example of FIG. 5, different pointers 510 in a page 508 may point to the same command in the table 512. Thus, when either of these pointers 510 are selected, the same command is retrieved from the table 512.

Additionally, as seen in the example of FIG. 5, the table 512 includes commands to which a pointer 510 does not point. In these instances, those commands are considered linked to the preceding command in the table 512 and are executed automatically when the preceding command is executed. For example, the first pointer 510 in page0 points to the third command in the table 512. The fourth command in the table 512 has no corresponding pointer 510. Thus, when the third command is executed, the host controller 106 automatically executes the fourth command in table 512 as well.

The auto-command pointer table (ACPT) (or pages 508) is an array of memory elements which stores the index of the auto-command table (ACT) 512 entries. On detecting a MDB match, the host controller 106 refers to this array through the specific interrupt identifier (SII) of the received MDB to get to know the index of the ACT. The ACT index referred from the ACPT is used by the host controller 106 to pick the pre-programmed command for execution. The host controller 106 may execute multiple successive commands for an IBI when the command data structure supports command linking. The ACPT can be shared by multiple IRC registers 204 to use the common resource of the ACT.

The ACT is an array of transfer commands which stores the I3C transfer attributes like speed mode, read data source index, transfer size, etc. The programmed transfer command may be issued to the interrupting target device 108 and thus, the command data structure may not include a target device address. The host controller 106 receives the target device address from the IBI ID received as a part of the IBI. The size of the ACT depends on the number of attached target devices 108 and other factors like how many of those devices 108 support IBI, MDB, etc. The architecture allows the host controller 106 to implement multiple ACTs. For example, if different target devices 108 use the same MDB value for their internal events and if the response requirements are different for these target devices 108 (e.g., speed modes, read source index, etc.), then more than one ACT may be implemented.

Figure 6A:
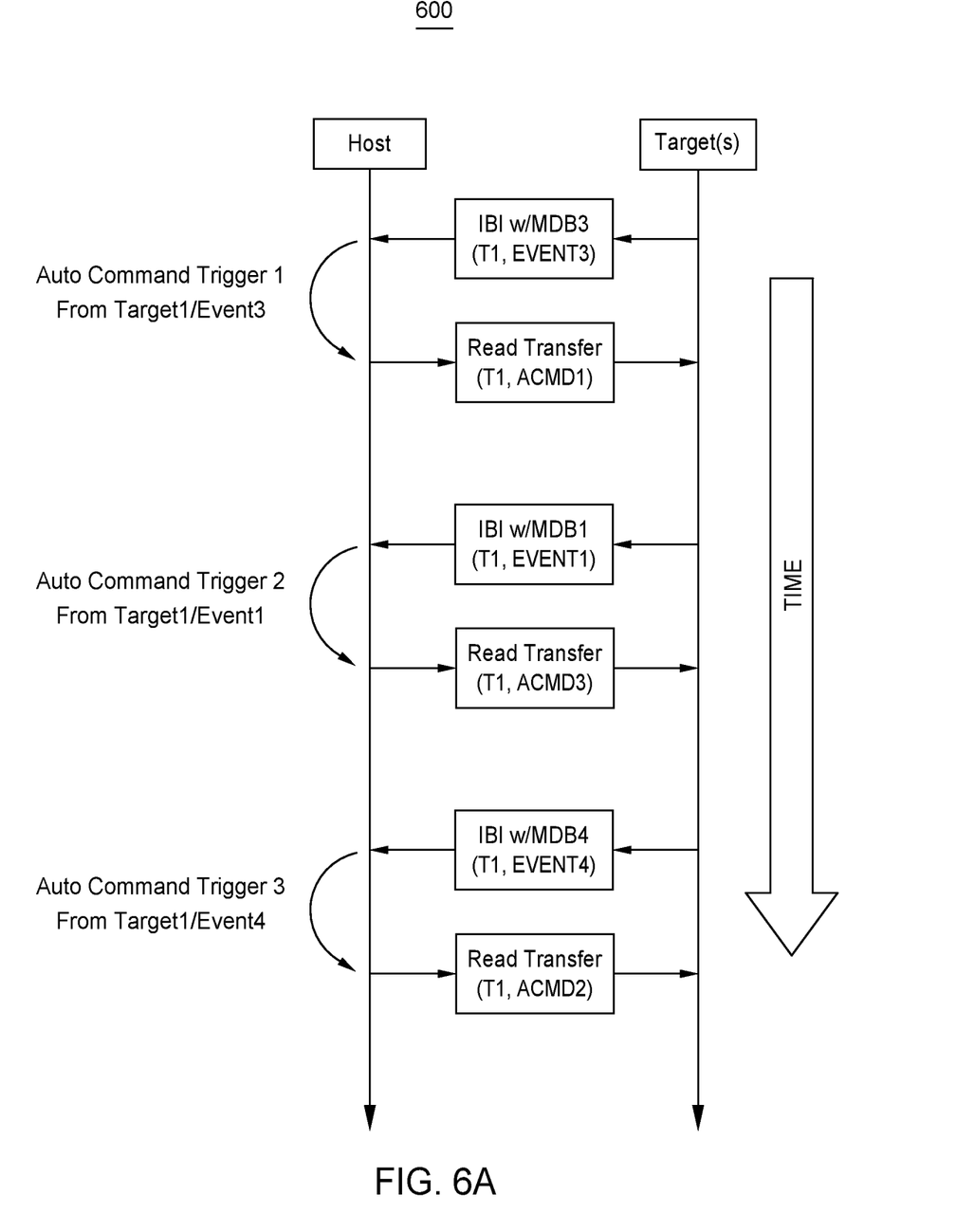
FIGS. 6A, 6B, and 6C illustrate example operations of the host controller and target devices.
Figure 6B:
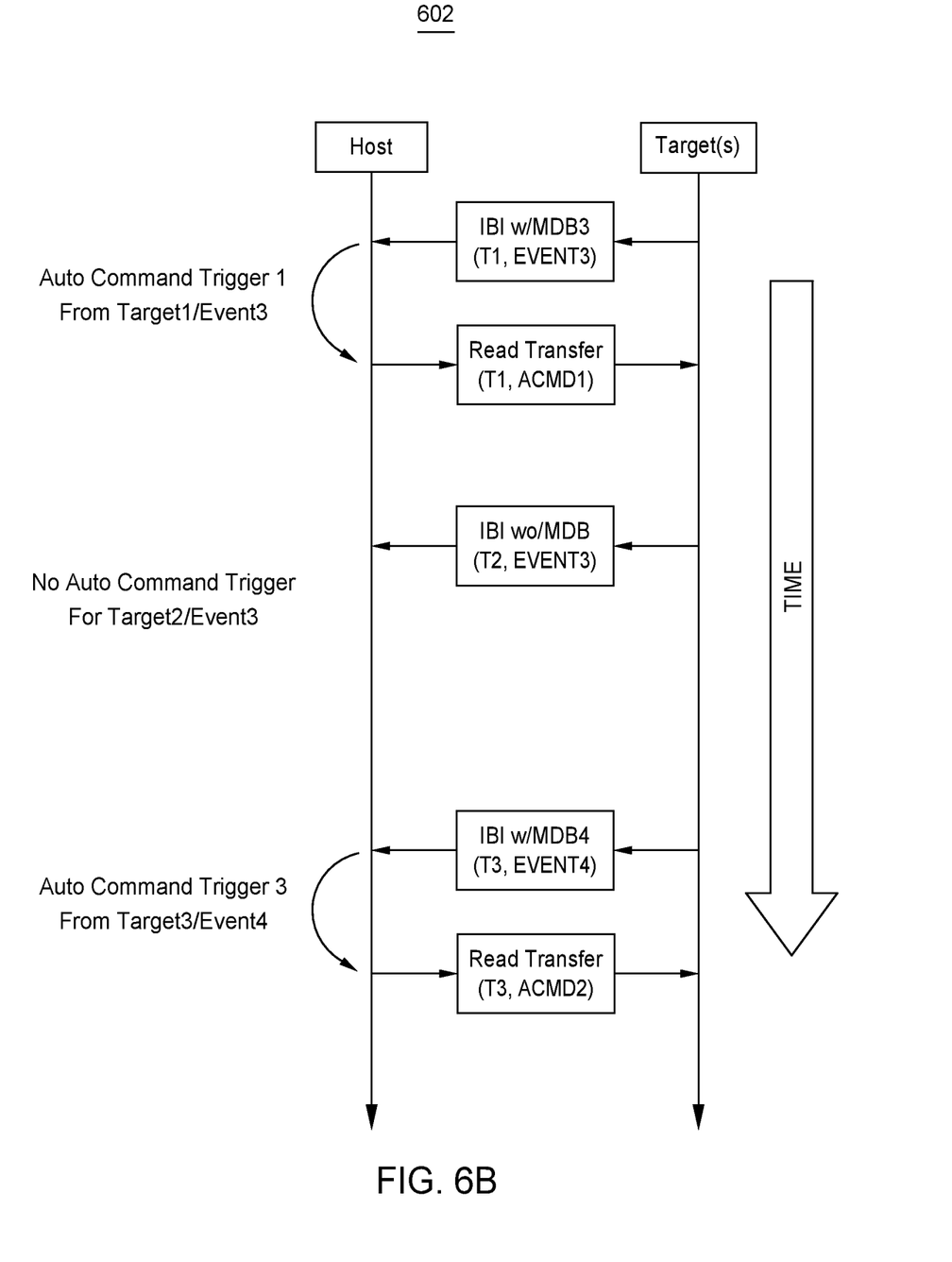
Figure 6C:
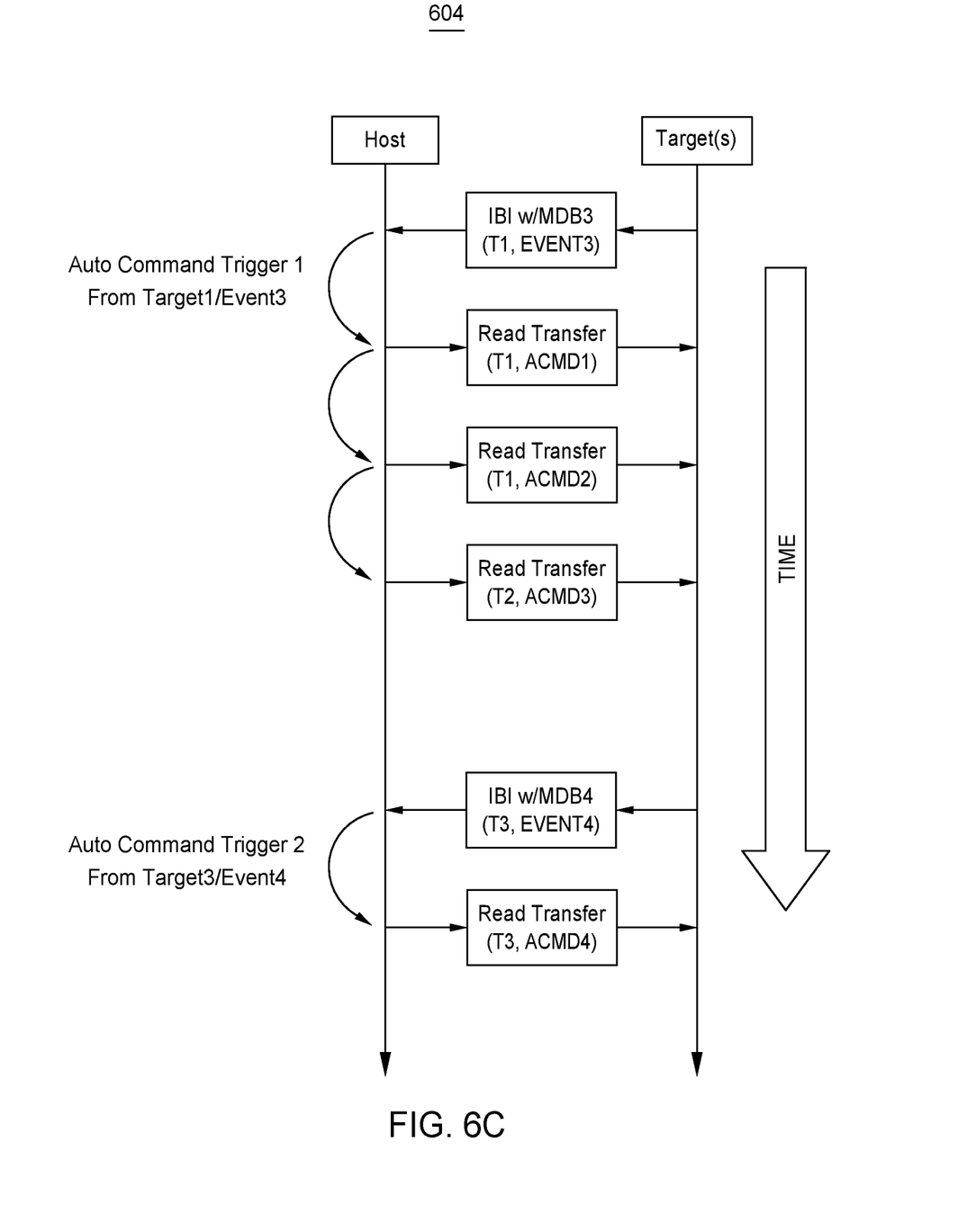

FIGS. 6A, 6B, and 6C illustrate example operations of the host controller 106 and target devices 108. Each example depicts the handling of IBIs with pending read notifications apart from responding to an IBI with ACK/NACK.

In FIG. 6A, the target device 108 may be a multi-functional device and may generate multiple IBIs for each functional event. If the target device 108 uses a unique MDB value and implements a different data source (identified through separate index or address) for each event, then the host controller 106 makes use of the unique MDB to map different data source index/address. In the example of FIG. 6A, the target device 108 communicates a first IBI with MDB3 indicating an Event3. In response, the host controller 106 performs a read transfer using an auto command trigger 1. The target device 108 communicates a second IBI with MDB1 indicating an Event1. In response, the host controller 106 performs a read transfer using an auto command trigger 2. The target device 108 communicates a third IBI with MDB4 indicating an Event4. In response, the host controller 106 performs a read transfer using an auto command trigger 3.

FIG. 6B shows an example where different target devices 108 expect different responses based on their capabilities from the host controller 106. Some target devices 108 support high speed transfer where the host controller 106 is expected to read the data faster to avoid overflow conditions. The host controller 106 makes the decision on the fly to respond appropriately. For the IBIs coming from the target devices 108 that do not support MDB, then the host controller 106 acts appropriately by not sending additional clocks to retrieve the MDB. In the example of FIG. 6B, a target device 108 communicates an IBI with MDB3. In response the host controller 106 performs a read transfer using an auto command trigger 1. A target device 108 communicates an IBI without MDB. The host controller 106 determines that this target device 108 does not support MDB, and does not respond. A target device 108 communicates an IBI with MDB4. In response, the host controller 106 performs a read transfer using an auto command trigger 3.

The host controller 106 may read data from multiple data sources (indexed) within the same multifunction target device 108 for a single event. For example, one data source may return data payload from function-1, another data source may return data payload from function-2, and so on. The architecture supports the issuance of a number of successive read transfer commands for a single event from a target device 108. FIG. 6C shows an example where the host controller 106 issues a sequence of read commands from the auto-command table upon detecting an IBI with MDB3. Each read transfer differs from the others in sending different source data index based on the received SII before the actual read.

Figure 7:
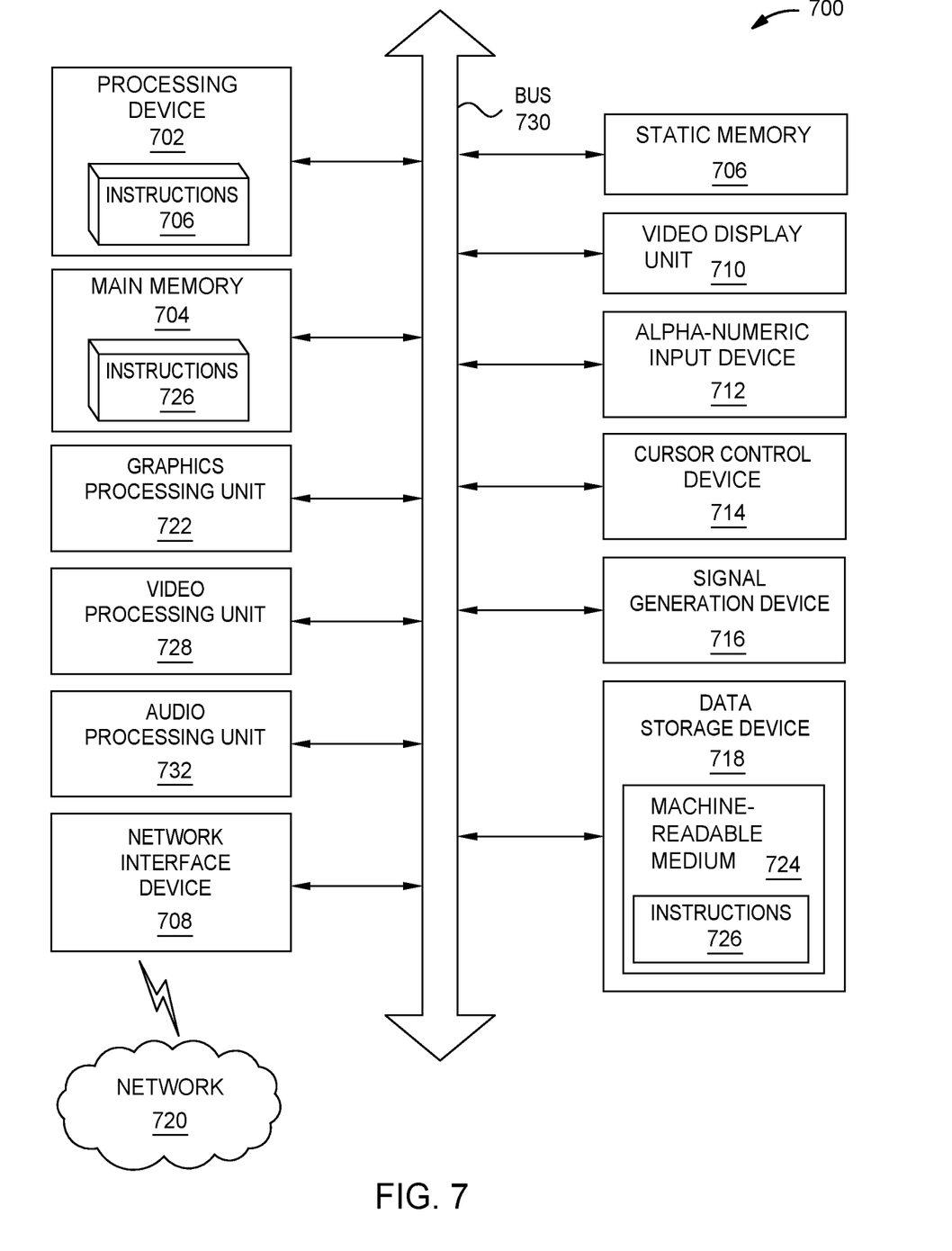
FIG. 7 depicts an abstract diagram of an example computer system in which embodiments of the present disclosure may operate.

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM), a static memory 706 (e.g., flash memory, static random access memory (SRAM), etc.), and a data storage device 718, which communicate with each other via a bus 730.

Processing device 702 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 may be configured to execute instructions 726 for performing the operations and steps described herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a non-transitory computer-readable medium) on which is stored one or more sets of instructions 726 or software embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In some implementations, the instructions 726 include instructions to implement functionality corresponding to the present disclosure. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 702 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A device comprising:
a memory configured to store a plurality of pages of pointers and a table of commands;
a plurality of registers configured to store information about a plurality of target devices;
a multiplexer/demultiplexer circuit configured to select (i) information from a register of the plurality of registers based on a request received from a target device of the plurality of target devices, (ii) a page from the plurality of pages based on the selected information, and (iii) a pointer from the selected page based on the selected information; and
a controller circuit configured to execute a first command from the table of commands based on the selected pointer and to execute a second command from the table of commands after executing the first command, wherein the second command is stored next to the first command in the table of commands, and wherein the pointers in the selected page point to commands in the table of commands other than the second command.

2. The device of claim 1, wherein the request comprises an I3C in-band interrupt.

3. The device of claim 1, wherein the controller circuit is further configured to disregard a second request received from a target device of the plurality of target devices based on information stored in a register of the plurality of registers selected by the multiplexer/demultiplexer circuit based on the second request.

4. The device of claim 1, wherein the controller circuit is configured to execute the first command by reading data from the target device of the plurality of target devices.

5. The device of claim 1, wherein at least two pointers from the selected page point to a same command in the table of commands.

6. The device of claim 1, wherein the multiplexer/demultiplexer circuit comprises:
a first multiplexer configured to select a data byte of the target device based on an address of the target device in the request;
a second multiplexer configured to select a page identifier from the register of the plurality of registers based on the address of the target device in the request; and
a demultiplexer configured to select the page of the plurality of pages based on the page identifier, wherein the selected data byte identifies the pointer from the selected page.

7. The device of claim 1, wherein the controller circuit is further configured to communicate information received by executing the first command to a hardware processor.

8. A method comprising:
storing a plurality of pages of pointers and a table of commands;
storing, at a plurality of registers, information about a plurality of target devices;
selecting, by a multiplexer/demultiplexer circuit, (i) information from a register of the plurality of registers based on a request received from a target device of the plurality of target devices, (ii) a page from the plurality of pages based on the selected information, and (iii) a pointer from the selected page based on the selected information;
executing, by a processing device, a first command from the table of commands based on the selected pointer; and
executing a second command from the table of commands after executing the first command, wherein the second command is stored next to the first command in the table of commands, and wherein the pointers in the selected page point to commands in the table of commands other than the second command.

9. The method of claim 8, wherein the request comprises an I3C in-band interrupt.

10. The method of claim 8, further comprising disregarding, by the processing device, a second request received from a target device of the plurality of target devices based on information stored in a register of the plurality of registers selected based on the second request.

11. The method of claim 8, further comprising executing, by the processing device, the command by reading data from the target device of the plurality of target devices.

12. The method of claim 8, wherein at least two pointers from the selected page point to a same command in the table of commands.

13. The method of claim 8, wherein:
a data byte of the target device is selected based on an address of the target device in the request;
a page identifier from the register of the plurality of registers is selected based on the address of the target device in the request; and
the page of the plurality of pages is selected based on the page identifier, wherein the selected data byte identifies the pointer from the selected page.

14. The method of claim 8, further comprising communicating, by the processing device, information received by executing the command to a hardware processor.

15. A system comprising:
a hardware processor; and
a host controller communicatively coupled to the hardware processor, the host controller comprising:
a memory configured to store a plurality of pages of pointers and a table of commands;
a plurality of registers configured to store information about a plurality of target devices;
a multiplexer/demultiplexer circuit configured to select (i) information from a register of the plurality of registers based on a request received from a target device of the plurality of target devices, (ii) a page from the plurality of pages based on the selected information, and (iii) a pointer from the selected page based on the selected information; and
a controller circuit configured to:
execute a first command from the table of commands based on the selected pointer; and
communicate information received by executing the first command to the hardware processor.

16. The system of claim 15, wherein the request comprises an I3C in-band interrupt.

17. The system of claim 15, wherein the controller circuit is further configured to execute a second command from the table of commands after executing the first command, wherein the second command is stored next to the first command in the table of commands, and wherein the pointers in the selected page point to commands in the table of commands other than the second command.

18. The system of claim 15, wherein the multiplexer/demultiplexer circuit comprises:
- a first multiplexer configured to select a data byte of the target device based on an address of the target device in the request;
- a second multiplexer configured to select a page identifier from the register of the plurality of registers based on the address of the target device in the request; and
- a demultiplexer configured to select the page of the plurality of pages based on the page identifier, wherein the selected data byte identifies the pointer from the selected page.

* * * * *